United States Patent [19]

Narita et al.

[11] Patent Number: 4,837,694
[45] Date of Patent: Jun. 6, 1989

[54] PITCHING CONTROL SYSTEM FOR A SKID STEER VEHICLE

[75] Inventors: Toshihide Narita; Yoshio Kadokawa, both of Kariya, Japan

[73] Assignee: Kabushiki Kaisha Toyoda Jidoshokki Seisakusho, Aichi, Japan

[21] Appl. No.: 31,998

[22] Filed: Mar. 27, 1987

[30] Foreign Application Priority Data

Mar. 28, 1986 [JP] Japan .................. 61-72219

[51] Int. Cl.⁴ .................. G06F 15/14; G06G 7/00
[52] U.S. Cl. .................. 364/426.01; 364/424.05; 180/6.48
[58] Field of Search ........... 364/424, 426, 562, 426.01, 364/426.02, 426.04; 280/707; 180/6.48, 6.5, 6.58, 6.6, 6 M, 9.1, 197, 41, 8.1, 24.08

[56] References Cited

U.S. PATENT DOCUMENTS

| | | | |
|---|---|---|---|
| 3,841,423 | 10/1974 | Holtkamp et al. | 180/6.48 X |
| 3,971,453 | 7/1976 | Patton et al. | 180/6.48 |
| 4,044,848 | 8/1977 | Wilkins | 180/6.5 |
| 4,215,403 | 6/1980 | Pollard et al. | 280/707 X |
| 4,359,116 | 11/1982 | Mankey | 180/6.54 X |
| 4,376,371 | 3/1983 | Kojima et al. | 180/6.48 X |
| 4,570,441 | 2/1986 | Yoshida et al. | 180/6.48 X |
| 4,586,728 | 5/1986 | Tokunaga et al. | 280/707 |
| 4,674,767 | 6/1987 | Kuroki et al. | 280/707 |
| 4,686,626 | 8/1987 | Kuroki et al. | 280/707 X |
| 4,715,289 | 12/1987 | Okamoto et al. | 280/707 X |

Primary Examiner—Eugene R. LaRoche
Assistant Examiner—Seung Ham
Attorney, Agent, or Firm—Burgess, Ryan & Wayne

[57] ABSTRACT

A skid steer vehicle having a set of right driving wheels and a set of left driving wheels, a right driving unit for driving the right driving wheels, a left driving unit for driving the left driving wheels, and a pitching control system to suppress a pitching motion of the vehicle, the pitching control system being provided with a pitching motion detector or detectors to generate a signal indicating occurrence of the pitching motion of the vehicle, and a control unit for individually controlling the right and left driving units until suppression of the pitching motion of the vehicle is detected.

17 Claims, 16 Drawing Sheets

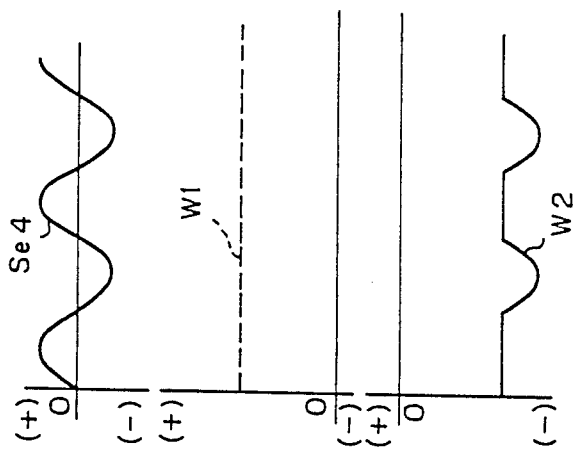
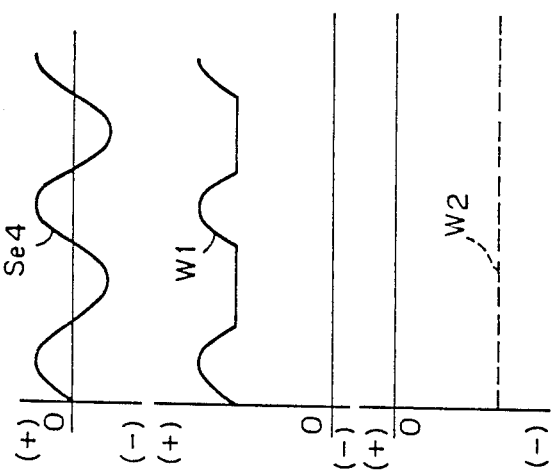

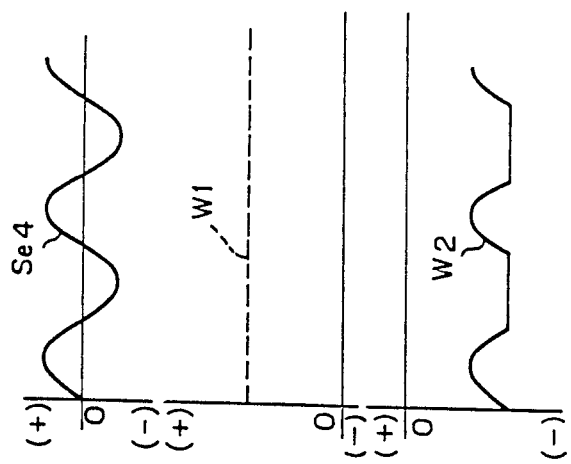
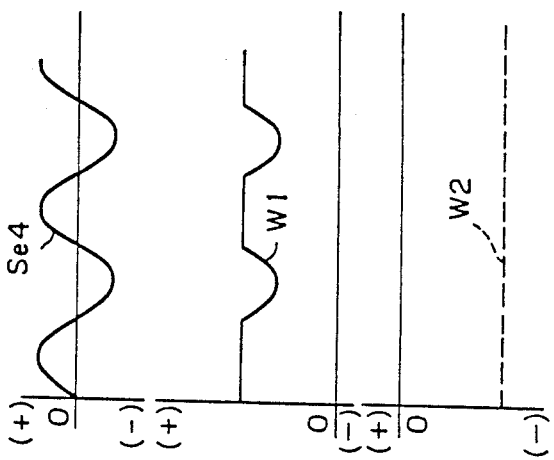

PITCHING CONTROL SYSTEM FOR A SKID STEER VEHICLE

BACKGROUND OF THE INVENTION

1. Field of the Invention

The present invention relates to a pitching control system for a skid steer vehicle, for suppressing the pitching motion of the skid steer vehicle liable to occur during turning and straight running.

2. Description of the Related Art

The skid steer vehicle is turned by a differential rotation of the right and left driving wheels thereof. During a skid-turn, the driving wheels of the skid steer vehicle skid, and consequently, the tires are deformed and produce a stick-slip motion, and the body jolts in a so-called pitching motion. The jolting movement of the body makes it difficult for the operator to properly control the control levers, and consequently, the pitching motion of the skid steer vehicle continues and the degree of pitching motion is increased.

The skid steer vehicle, in general, has a small wheel base for high turning performance, and hence the skid steer vehicle is liable to pitch even during straight running. As is generally known, the closer the weight distribution ratio to one, the greater the degree of pitching motion. Accordingly, it is a conventional practice in designing the geometry of the skid steer vehicle to improve the turning performance by increasing the unladen distributed weight on the rear wheels, but this makes reverse running unsafe. Furthermore, even if the gravitational center of the skid steer vehicle in the unladen state is biased toward the rear of the vehicle, this gravitational center shifts toward the front when the skid steer vehicle is laden, and therefore the laden weight distribution ratio approaches 1.0, and thus the degree of pitching motion is increased.

The pitching motion of the skid steer vehicle which occurs during turning and straight running not only makes the operator uncomfortable and unsteady, but may cause the skid steer vehicle to turn over. Accordingly, the pitching motion of the skid steer vehicle must be suppressed for safe running.

SUMMARY OF THE INVENTION

An object of the present invention is, accordingly, to obviate the foregoing problems encountered by the conventional skid steer vehicle.

Another object of the present invention is to provide a novel control system for suppressing the pitching of a skid steer vehicle.

A further object of the present invention is to provide an automatic system for suppressing a pitching motion of a skid steer vehicle to mitigate mental stress attributable to the pitching motion and having an adverse affect on the operator and to improve the maneuverability and safety of the vehicle.

In order to achieve the above objects of the invention, the present invention provides a system for controlling the pitching of a skid steer vehicle including a vehicle body, a set of right driving wheels arranged on one side of the vehicle body, a set of left driving wheels arranged on an opposite side of the vehicle, a first driving means for driving the set of right driving wheels, a second driving means for driving the set of left driving wheels, and a pair of first and second control levers provided in an operator's compartment of the vehicle body, comprising:

means for generating detection signal indicating detection of a pitching motion of said skid steer vehicle while said skid steer vehicle is in an operation mode including straight running operation and skid steer turning operation, and;

control means for generating control signals including pitching suppressing signals on the basis of said detection signals from said means for generating detection signals, and said control means simultaneously and independently delivers said control signals to said right and left driving means until said pitching motion of said skid steer vehicle is suppressed.

BRIEF DESCRIPTION OF THE DRAWINGS

The present invention will become more apparent from the following description of the embodiments thereof taken in conjunction with the accompanying drawings, wherein.

DESCRIPTION OF THE PREFERRED EMBODIMENTS

Figure 1:
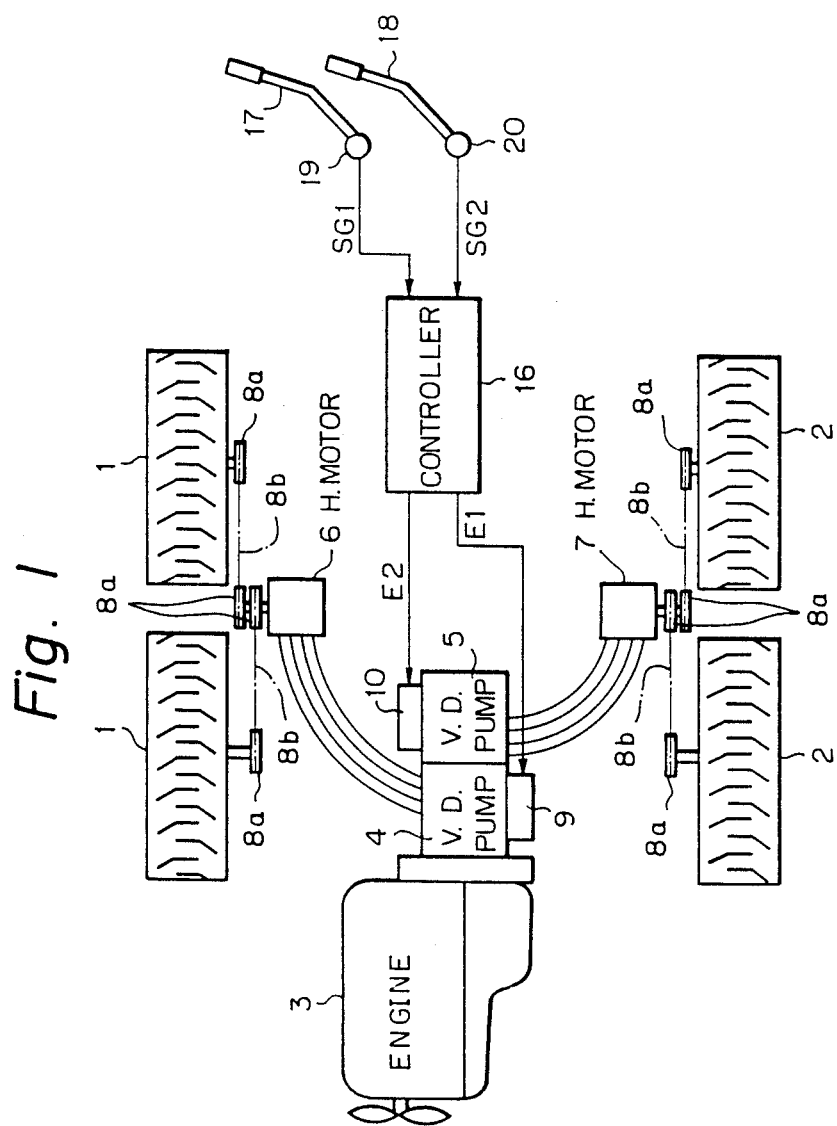
FIG. 1 is a diagrammatic illustration of the driving system of a skid steer vehicle incorporating the present invention.

Referring to FIG. 1 showing the driving system of a wheeled skid steer vehicle, left and right driving units respectively for driving left driving wheels 1 and right driving wheels 2 comprise left and right variable displacement pumps 4 and 5 which are driven by an engine 3 serving as a prime mover, and left and right hydraulic motors 6 and 7 operatively connected to the left driving wheels 1 and to the right driving wheels 2, respectively. The variable displacement pumps 4 and 5 supply hydraulic fluid to the hydraulic motors 6 and 7, respectively, to drive the hydraulic motors 6 and 7. The respective rotative forces of the hydraulic motors 6 and 7 are transmitted through sprockets 8a and chains 8b to the driving wheels 1 and the driving wheels 2, respectively. In this embodiment, the variable displacement pumps 4 and 5 are swash plate type hydraulic pumps, and the respective tilt angles of the swash plates of the variable displacement pumps 4 and 5 are regulated by swash plate actuators 9 and 10 provided on the variable displacement pumps 4 and 5 to control the direction and rotating speed of the output shafts of the left hydraulic motor 6 and the right hydraulic motor 7, respectively. Although the present invention employs the engine 3 as the prime mover, the prime mover is not limited thereto, and may be any prime mover suitable for operating the driving units, such as an internal-combustion engine, an external-combustion engine or a electric motor. The variable displacement pumps 4 and 5 may be of a bent axis type or of any other appropriate type.

Figure 2:
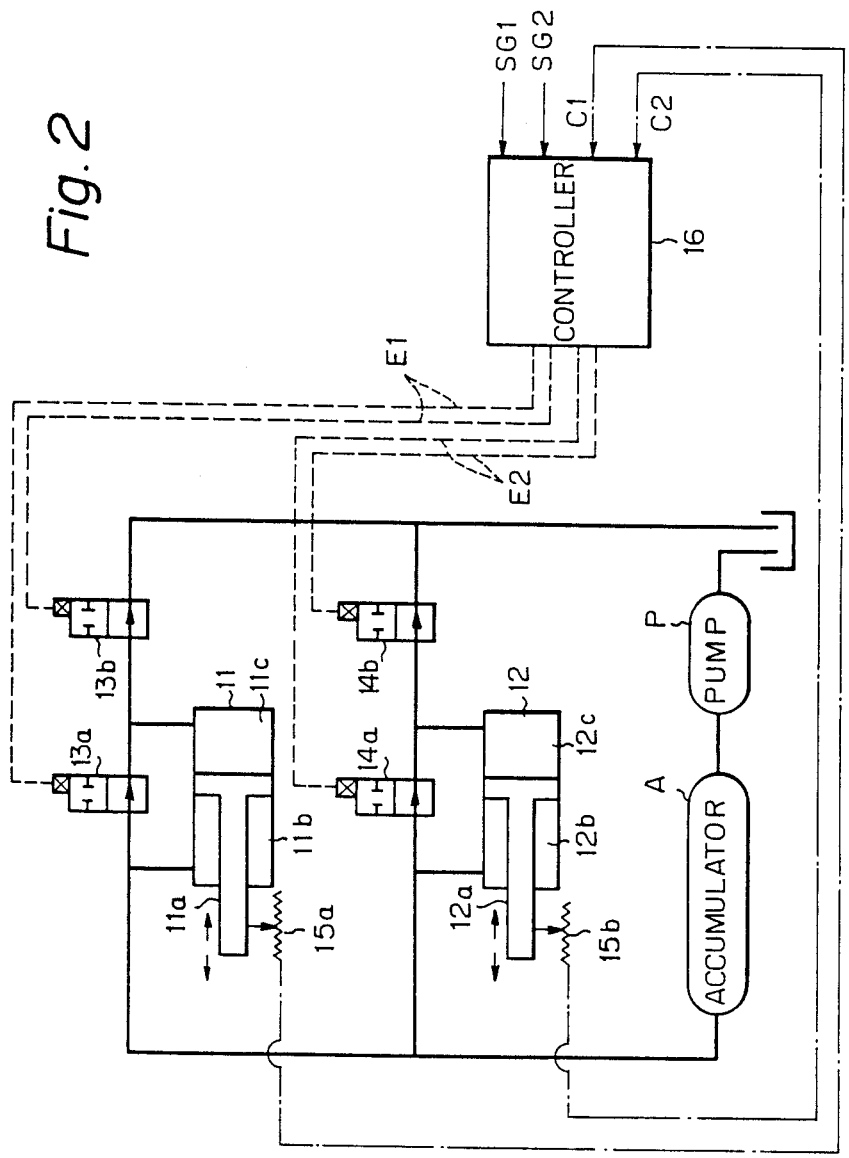
FIG. 2 is a hydraulic circuit diagram of a swash plate actuator.

As shown in FIG. 2, in this embodiment, the swash plate actuators 9 and 10 are embodied in a left hydraulic cylinder 11 and a right hydraulic cylinder 12, respectively. Two poppet valves 13a and 13b and two poppet valves 14a and 14b are provided in lines for supplying the hydraulic fluid to and returning same from the hydraulic cylinders 11 and 12 respectively for regulating the tilt angles of the swash plates, respectively. A left rod position detector 15a and a right rod position detector 15b are associated with the respective piston rods 11a and 12a of the hydraulic cylinders 11 and 12 operatively connected to the respective swash plates of the left variable displacement pump 4 and the right variable displacement pump 5, to detect the respective positions of the piston rods 11a and 12a, respectively.

A controller 16, which will be described later, applies swash plate tilt angle signals E1 and E2 to the poppet valves 13a, 13b, 14a, and 14b to intermittently open or close the same for so-called duty control, in which the duty cycle of each poppet valve is varied. Supply of the hydraulic fluid sucked up from a tank by a pump P and accumulated in an accumulator A to the hydraulic cylinders 11 and 12 is controlled through the duty control of the poppet valves to move the piston rods 11a and 12a at a predetermined speed to predetermined positions.

When the poppet valves 13a and 14a are closed and the poppet valves 13b and 14b are opened intermittently at a fixed frequency, the hydraulic fluid is supplied into the respective chambers 11b and 12b of the hydraulic cylinders 11 and 12, so that the piston rods 11a and 12a are moved at a predetermined speed to the right, as viewed in FIG. 2. Conversely, when the poppet valves 13b and 14b are closed and the poppet valves 13a and 14a are opened intermittently at a fixed frequency, the hydraulic fluid is supplied into the respective chambers 11b and 11c, and 12b and 12c of the hydraulic cylinders 11 and 12. Then, the piston rods 11a and 12a are moved to the left, as viewed in FIG. 2, at a predetermined speed, because the effective areas of the piston rods 11a and 12a in the chambers 11b and 11c, and in the chambers 12b and 12c are different. The predetermined speed of the piston rods 11a and 12a is dependent on the flow rate of the hydraulic fluid regulated by the intermittent opening of the poppet valves 13a and 14a. Detection signals C1 and C2 provided by the rod position detectors 15a and 15b are given to the controller 16 for feedback control to move the piston rods 11a and 12a at a predetermined moving speed to predetermined positions.

Although the respective tilt angles of the swash plates of the variable displacement pumps are controlled for suppressing the pitching motion of the skid steer vehicle in this embodiment, the means for suppressing the pitching motion is not necessarily limited thereto; e.g., the motors may be controlled by means of variable displacement hydraulic motors. Furthermore, the output of each motor and the sprockets 8a may be operatively interconnected by an additional actuator, and the actuator may be driven and controlled for pitching control. That is, any means capable of controlling the rotating speed and torque of the wheels 1 and 2 on the basis of pitching control signals is applicable. Still further, the swash plate actuators are not necessarily limited to those employed in this embodiment, in that the swash plate actuators may employ three-way valves for distributing the hydraulic fluid to the chambers 11b and 11c of the hydraulic cylinder 11, and to the chambers 12b and 12c of the hydraulic cylinder 12, or proportional electromagnetic valves or electro-hydraulic servo valves may be employed. That is, the swash plate actuators may comprise any means capable of controlling the discharge rate and the rate of variation of the discharge rate of the variable displacement pumps.

As shown in FIG. 1, a left manual control lever 17 and a right manual control lever 18 provided in the operator's compartment are associated with a left control amount detector 19 and a right control amount detector 20, namely, potentiometers in this embodiment, respectively, which provides control amount signals SG1 and SG2 proportional to the respective control amounts of the manual control levers 17 and 18, respectively. The control amount detectors 19 and 20 are not limited to potentiometers; for example, the control amount detectors 19 and 20 may be inductance-type detectors or capacitance-type detectors.

Figure 3:
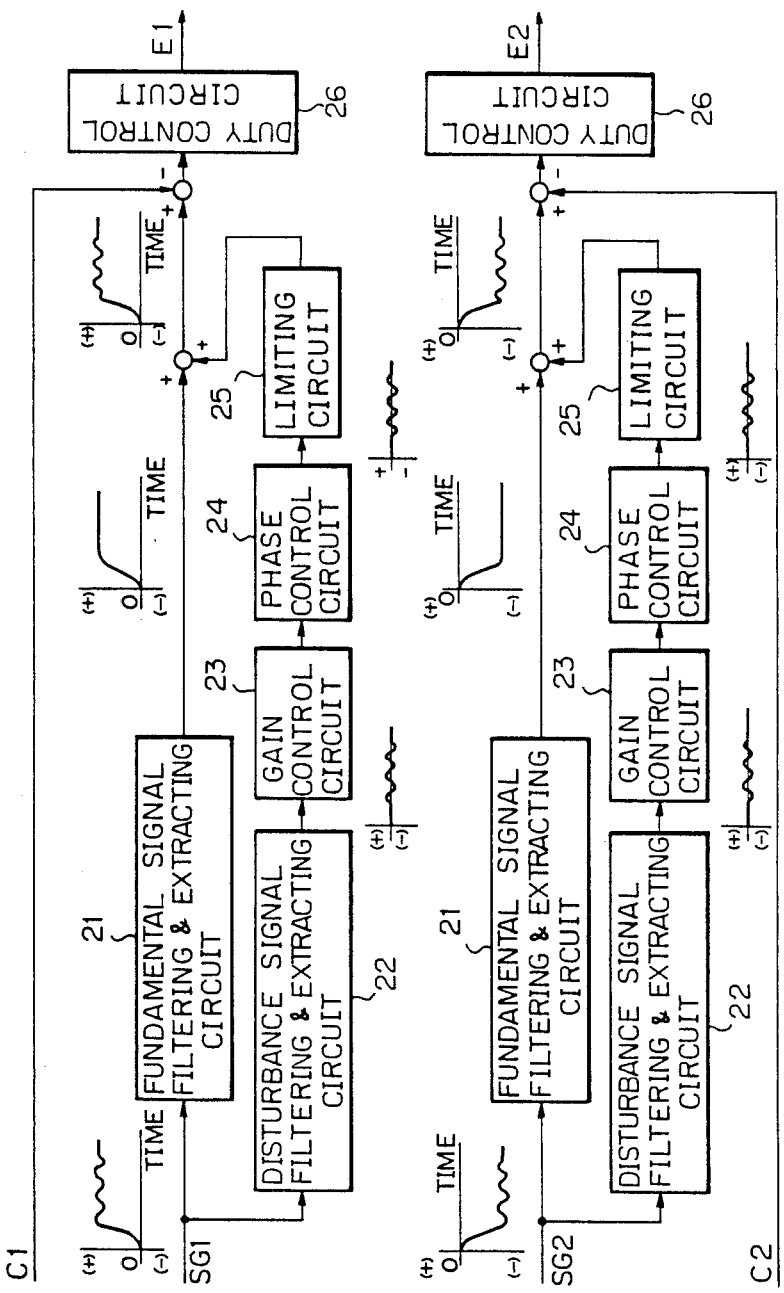
FIG. 3 is a block diagram showing the electrical constitution of a pitching control system, in a first embodiment according to the present invention.

When a pitching motion occurs during the running operation of the skid steer vehicle and vibrations attributable to the pitching motion are transmitted through the operator to the manual control levers 17 and 18, the control amount detectors 19 and 20 produce signals corresponding to the minute vibrations thereof, and the signals are added to the control amount signals SG1 and SG2, respectively, as shown in FIG. 3.

The controller 16 receives the control amount signals SG1 and SG2 from the control amount detectors 19 and 20, respectively, as input signals, then calculates, on the basis of the input signals, the driven directions and driven amounts of the left driving wheels 1 and the right driving wheels 2 corresponding to the respective positions of the left manual control lever 17 and the right manual control lever 18, and also determines, on the basis of the signals SG1 and SG2, whether or not pitching motion has occurred, and then calculates in which the left driving wheels 1 and the right driving wheels 2 are to be driven, and the amounts by which the left driving wheels 1 and the right driving wheels 2 are to be driven, to suppress the pitching motion. Then, the controller, as mentioned above, gives the swash plate tilt angle signals E1 and E2 corresponding to the result of these calculations to the swash plate actuators 9 and 10 to regulate the respective tilt angles of the swash plates of the variable displacement pumps 4 and 5.

A concrete circuit constitution of the controller 16 will be described hereinafter with reference to the block diagram of FIG. 3. In the time charts showing the waveforms in FIG. 3, the values of the control amount signals SG1 and SG2 provided by the control amount detectors 19 and 20 are zero when the manual control levers 17 and 18 are placed in the neutral positions, respectively, and the values of the control amount signals SG1 and SG2 are positive when the manual control levers 17 and 18 are in forward drive positions, and are negative when the manual control levers 17 and 18 are in reverse drive positions, respectively.

Suppose that the left manual control lever 17 is pushed in a forward direction and the right manual control lever 18 is pushed in a reverse direction to turn the skid steer vehicle to the right. When the skid steer vehicle starts pitching, the control amount signals SG1 and SG2 produced by the control amount detectors 19 and 20 and given to the controller 16 include fundamental signals corresponding to the control amounts of the manual control levers 17 and 18 operated by the operator, and disturbance signals corresponding to the increments or decrements of the control amounts attributable to the pitching motion of the skid steer vehicle, respectively. That is, when the pitching motion occurs while the skid steer vehicle is running, the operator is jolted by the skid steer control levers 17 and 18 to move. Then, the control amount detectors 19 and 20 provide the disturbance signals corresponding to the motions of the manual control levers 17 and 18.

The controller 16 has a pair of signal processing circuits each comprising a fundamental signal filtering and extracting circuit 21, a series connection of a disturbance signal filtering and extracting circuit 22, a gain control circuit 23, a phase control circuit 24 and a limiting circuit 25, connected in parallel to the fundamental signal filtering and extracting circuit 21, and a duty control circuit 26. Since the respective signal processing modes of the pair of signal processing circuits of the controller 16 are similar to each other, the signal processing mode of one of the signal processing circuits for processing the control amount signal SG1 will be described herein.

The control signal SG1 is applied to both the fundamental signal filtering and extracting circuit 21 and the disturbance signal filtering and extracting circuit 22. The fundamental signal filtering and extracting circuit 21 and the disturbance signal filtering and extracting circuit 22 filter the control amount signal SG1 and extract the fundamental signal and the disturbance signal, respectively. The fundamental signal filtering and extracting circuit 21 and the disturbance signal filtering and extracting circuit 22, for example, are a low-pass filter and an automatic follow-up comparator, respectively, capable of such filtering and extracting functions. Additional low-pass filters and high-pass filter may be provided to filter the control amount signal SG1 to extract the fundamental signal and the disturbance signal.

The disturbance signal extracted by the disturbance signal filtering and extracting circuit 22 is applied to the gain control circuit 23, and the gain control circuit 23 then provides an output signal proportional at a gain to the disturbance signal. The gain control circuit may be a circuit such that output signals of a fixed gain varying in proportion to input signals are provided, that output signals of a fixed gain varying in proportion to input signals when the input singals are below a certain level and output signals of a fixed level when the input signals are above the certain level are provided, or that output signals of a fixed level regardless of the level of the input signals are provided.

The phase control circuit 24 adjusts the phase of the output signal of the gain control circuit 23, namely, an input signal, to provide an output signal coinciding with an optimum signal determined beforehand through experiments for suppressing the pitching motion. In this embodiment, the phase control circuit 24 inverts the input signal and shifts the phase of the input signal by approximately 90°. It has been confirmed by experiment that a phase shift by a phase angle in the range of $90° \pm 60°$ is effective for pitching suppression. The phase control circuit 24 may shift the phase of the input signal by a phase angle in that range.

The output signal of the phase control circuit 24 is given to the limiting circuit 25. The limiting circuit 25 provides an output signal proportional to the input signal when the level of the input signal is below a fixed level and provides a fixed output signal when the level of the input signal is above the fixed level. That is, the limiting circuit 25 limits the upper level of the output signal so that the swash plate tilt angle, and hence the driven amounts of the driving wheels 1 and 2, will not become excessively large. The gain control circuit 23, the phase control circuit 24 and the limiting circuit 25 need not necessarily be arranged in that order as long as these three circuits are arranged sequentially between the disturbance signal filtering and extracting circuit 22 and an adding point (adding circuit).

The output signal of the limiting circuit 25 is added to the fundamental signal provided by the fundamental signal filtering and extracting circuit 21, and then the detection signal C1 provided by the rod position detector 15a is subtracted from the added signal. That is, a difference signal corresponding to the difference between the added signal and the detection signal C1 is applied to the duty control circuit 26. The duty control circuit 26 provides a swash plate tilt angle signal E1 on the basis of the input signal so that the piston rod of the hydraulic cylinder 11 is moved at a predetermined speed to an appropriate position.

The function of the skid steer vehicle thus constituted will be described hereinafter.

Suppose that the left manual control lever 17 is pushed in a forward direction and the right manual control lever 18 is pulled in a reverse direction to turn the skid steer vehicle to the right, namely, to rotate the left driving wheels 1 forward and to rotate the right driving wheels 2 backward. Then, the control amount detectors 19 and 20 give control amount signals SG1 and SG2 corresponding to the respective positions of the manual levers 17 and 18, respectively, to the controller 16. At this moment, the control amount signals SG1 and SG2 include only fundamental signals, respectively. Then, the controller 16 gives swash plate tilt angle signals E1 and E2 corresponding to the control amount signals SG1 and SG2 to the swash plate actuators 9 and 10, respectively. The swash plate actuators 9 and 10 then change the tilt angles of the swash plates of the variable displacement pumps 4 and 5 on the basis of the swash plate tilt angle signals E1 and E2, respectively, so that the hydraulic motor 6 drives the left driving wheels 1 for forward rotation and the hydraulic motor 7 drives the right driving wheel 2 for reverse rotation. The detection signals C1 and C2 of the rod position detectors 15a and 15b are given to the controller 16 for the feedback control of the positions of the pistons rods 11a and 12a to reduce the difference between the current position of the piston rod 11a and a target value, and the difference between the current position of the piston rod 12a and a target value to zero, and to set the swash plates of the variable displacement pumps at predetermined tilt angles, respectively.

When a pitching motion occurs while the driving wheels 1 and 2 are being driven, the operator is jolted, and consequently the manual control levers 17 and 18 gripped by the operators are caused to shake. The control amount detectors 19 and 20 detect the shaking motions of the manual control levers 17 and 18, and then give detection signals corresponding to the shaking motions, respectively, to the controller 16. The controller 16 filters and divides each of the control amount signals SG1 and SG2 into a fundamental signal and a disturbance signal. Each disturbance signal is subjected to gain control, is inverted, and is then, adjusted to a signal of a level below a predetermined level by the limiting circuit 25. The output signals of the limiting circuits 25 and added to the fundamental signals of the control amount signals SG1 and SG2, respectively, and the respective detection signals C1 and C2 of the rod position detectors 15a and 15b are subtracted from the added signals to provide the swash plate tilt angle signals E1 and E2, respectively. Thus, the disturbances in the position of the manual control levers 17 and 18 attributable to the pitching motion are detected in the form of the disturbance signals, the disturbance signals are filtered and extracted from the control amount signals SG1 and SG2, respectively, and the disturbance signals are then inverted to add signals for driving the driving wheels 1 and 2 in directions for suppressing the pitching motion to the fundamental signals.

The swash plate actuators 9 and 10, as mentioned above, are controlled on the basis of the swash plate tilt angle signals E1 and E2 containing the disturbance signals for suppressing the pitching motion, and the feedback signals, namely, the detection signals C1 and C2 of the rod position detectors 15a and 15b, to regulate the tilt angles of the swash plates of the variable displacement pumps 4 and 5 so that the driving wheels 1 and 2 are driven in directions for suppressing the pitching motion by the hydraulic motors 6 and 7, respectively. Thus, the pitching motion of the skid steer vehicle is suppressed.

To turn the skid steer vehicle to the left, the manual control levers 17 and 18 are operated in directions reverse to those for turning the skid steer vehicle to the right. A pitching motion of the skid steer vehicle during turning to the left is suppressed in a manner similar to that for suppressing the pitching motion of the skid steer vehicle during a turn to the right. That is, disturbances attributable to the pitching motion are detected by the control amount detectors 19 and 20, and the driving wheels 1 and 2 are controlled operatively to suppress the pitching motion on the basis of the result of the control operations including filtering, extracting and converting the disturbance signals.

A pitching motion during the straight forward or reverse running of the skid steer vehicle also causes the shaking motions of the manual control levers 17 and 18, which are detected by the control amount detectors 19 and 20, then disturbance signals corresponding to the shaking motions of the manual control levers 17 and 18 attributable to the pitching motion are processed through the control operations for suppressing the pitching motion, including filtering, extracting and inverting the disturbance signals, then the swash plate tilt angle signals E1 and E2 are provided to control the driving wheels 1 and 2 so that the pitching motion is suppressed.

Thus, in the skid steer vehicle equipped with the first embodiment of the present invention, a pitching motion of the skid steer vehicle during turning or straight running is detected through the detection of the shaking motions of the manual control levers 17 and 18, and the results of detection are processed to suppress the pitching motion. Consequently, comfort in riding in the skid steer vehicle is improved, and the safety, maneuverability and performance of the skid steer vehicle are enhanced. Furthermore, a problem which has been inherent to a skid steer vehicle having a small wheel base that a pitching motion is liable to occur is solved and, as mentioned above, since the skid steer performance of the skid steer vehicle is improved, the wheel base can be increased, which further enhances the safety of the skid steer vehicle.

As is generally known, the closer the weight distribution ratio to one, the greater the degree of pitching motion. Accordingly, it is a conventional practice in designing the geometry of the skid steer vehicle to improve the turning performance by increasing the unladen weight on the rear wheels, which, however, makes the reverse running unsafe. Furthermore, even if the gravitational center of the skid steer vehicle in the unladen state is biased toward the rear, the gravitational center shifts toward the front when the skid steer vehicle is laden, and thereby the laden weight distribution ratio approaches one, and hence the degree of the pitching motion is increased. This embodiment is capable of solving the foregoing problems to suppress the pitching motion of the skid steer vehicle.

A second embodiment of the present invention will be described hereinafter.

Figure 4:
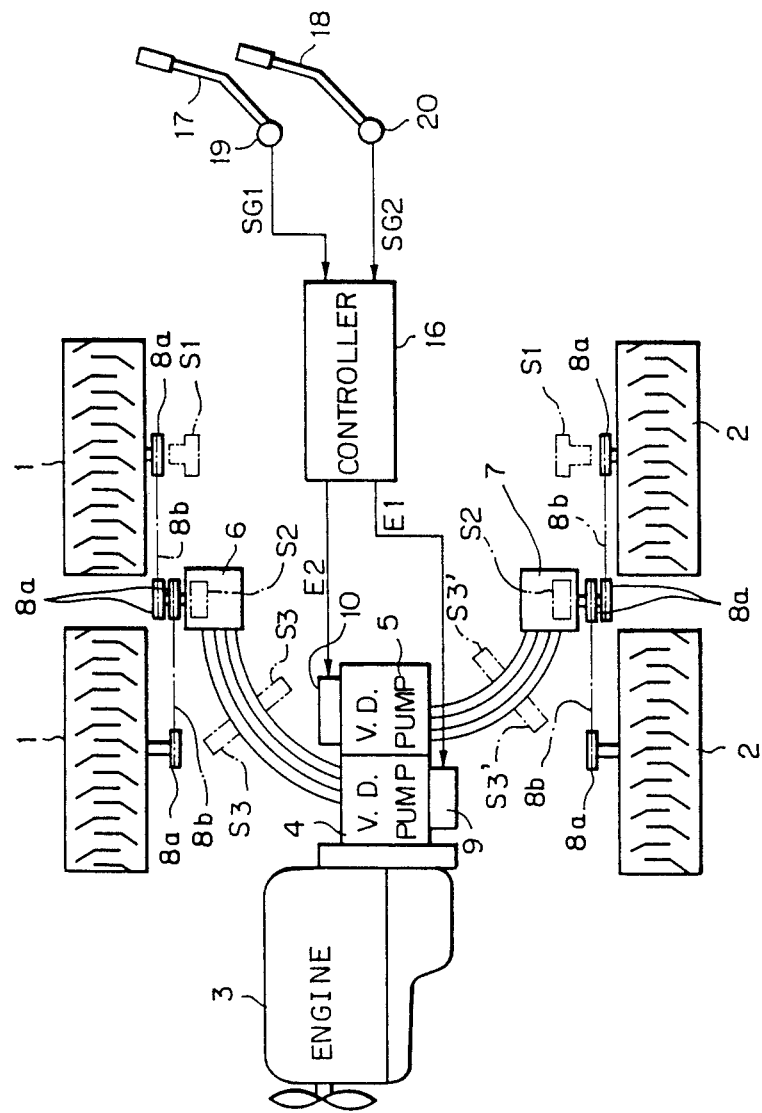
FIG. 4 is a diagrammatic illustration of the driving system of another skid steer vehicle.

Referring to FIG. 4 diagrammatically showing the driving system of a skid steer vehicle, a rotation detector S1 is associated with each of the respective driving shafts of a left driving wheel 1 and a right driving wheel 2. The detection signal of the rotation detector S1 is given to a controller 16. It is found that, during the turning operation of the skid steer vehicle, a pitching motion occurs in a vertical plane containing the diagonal, namely, a line extending between the front right and the rear left or a line extending between the front left and the rear right of the skid steer vehicle. The second embodiment has been made in view of the fact that the rotating speed of the driving wheel 1 or 2 on the side plunging down tends to fall, while the rotating speed of the driving wheel 1 or 2 on the side pitching up tends to rise.

Figure 5:
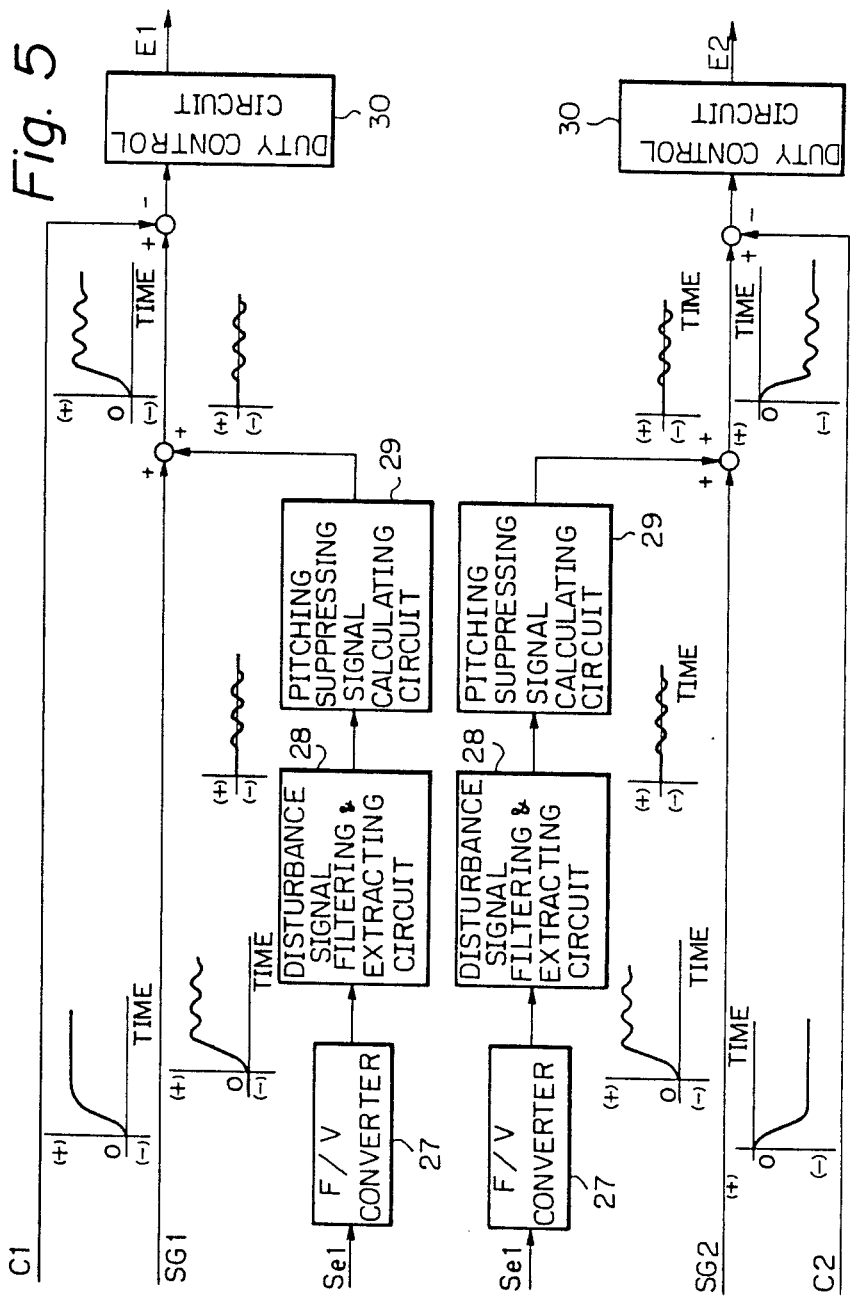
FIG. 5 is a block diagram showing the electrical constitution of a pitching control system, in a second embodiment according to the present invention.

Referring now to FIG. 5 showing the constitution of the controller 16, the controller 16 has a pair of signal processing circuits each comprising, in a series connection, a frequency to voltage converter 27, a disturbance signal filtering and extracting circuit 28, a pitching suppressing signal calculating circuit 29, and a duty control circuit 30. Since the respective signal processing modes of the pair of signal processing circuits are similar to each other, only the signal processing mode of one of the pair of signal processing circuits will be described herein.

Pulse signal Se1 produced by the rotation detector S1 is applied to the frequency to voltage converter 27, then the frequency to voltage converter 27 performs operations to calculate the rotating speed of the corresponding driving shaft. Then, the disturbance signal filtering and extracting circuit 28 filters and extracts a disturbance signal corresponding to a disturbance attributable to the pitching motion from the output signal, namely, a voltage signal, of the frequency to voltage converter 27. Then the pitching suppressing signal calculating circuit 29 controls the gain of the output signal of the disturbance signal filtering and extracting circuit 28, adjusts the waveform of the disturbance signal so that the phase of the disturbance signal is substantially the same as that of an experimental waveform optimum for suppressing the pitching motion, and further adjusts the disturbance signal so that the level thereof is below an upper limit, for pitching suppressing signal processing to provide a pitching suppressing signal.

A control amount signal SG1 filtered by a low-pass filter and containing only a fundamental signal is added to the pitching suppressing signal at an adding point, and then a detection signal of a rod position detector 15a is subtracted from the pitching suppressing signal at another adding point. Then, the duty control circuit 30 adjusts the duty ratio of the added signal and provides a swash plate tilt angle signal E1. The other pulse signal Se1 produced by the other rotation detector S1, the other control amount signal SG2 and the detection signal C2 of the rod position detector 15b are processed in the same signal processing mode to provide a swash plate tilt angle signal E2. The rest of the operation based on the swash plate tilt angle signals E1 and E2 are the same as those in the first embodiment.

A third embodiment of the present invention will be described hereinafter.

Referring to FIG. 4, a torque detector S2 is associated with each of the respective output shafts of the hydraulic motors 6 and 7. The detection signals of the torque detectors are given to the controller 16. In the third embodiment, a pitching motion that occurs during turning operation of a skid steer vehicle in a vertical plane containing the diagonal of the skid steer vehicle is detected through the detection of increase of the torque acting on the output shaft of the hydraulic motor 6 or 7 on the side plunging down and decrease of the torque acting on the output shaft of the hydraulic motor 7 or 6 on the side pitching up.

Figure 6:
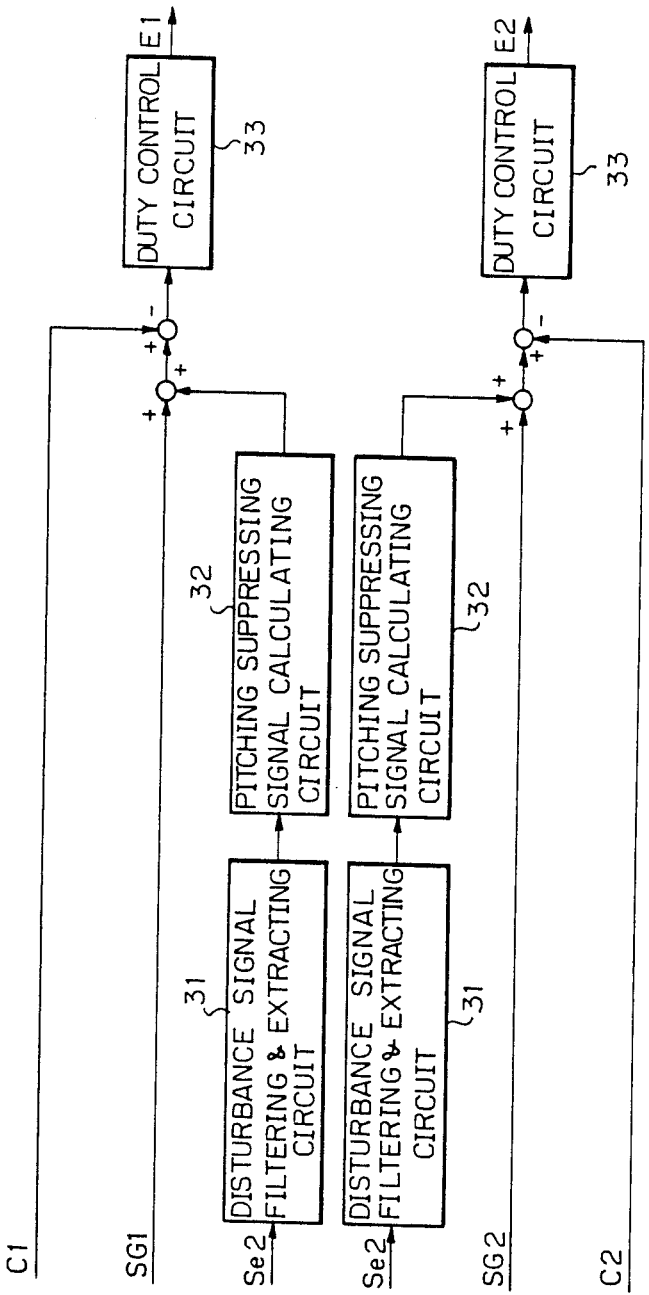
FIG. 6 is a block diagram showing the electrical constitution of a pitching control system, in a third embodiment according to the present invention.

Referring to FIG. 6, a controller 16 has a pair of signal processing circuits each comprising, in a series connection, a disturbance signal filtering and extracting circuit 31, a pitching suppressing signal calculating circuit 32 and a duty control circuit 33. Since the respective signal processing modes of the pair of signal processing circuits are similar to each other, only the signal processing mode of one of the signal processing circuits for processing a control amount signal SG1 will be described herein.

A detection signal Se2 of the torque detector S2 is applied to the disturbance signal filtering and extracting circuit 31 of the controller 16. The disturbance signal filtering and extracting circuit 31 filters the detection signal Se2 and extracts only a disturbance signal corresponding to a disturbance attributable to the pitching motion. The pitching suppressing signal calculating circuit 32 adjusts the gain of the output signal of the disturbance signal filtering and extracting circuit 31, shifts the phase of the output signal and inverts the output signal so that the waveform of the output signal conforms to an optimum waveform for pitching suppression determined through experiments to provide a pitching suppressing signal. A control amount signal SG1 filtered by a low-pass filter and containing only a fundamental signal is added to the pitching suppressing signal at an adding point, and a detection signal C1 of the rod position detector 15a is subtracted from the addition. The duty control circuit 33 adjusts the duty ratio of a signal resulting from the adding and subtracting operations and provides a swash plate tilt angle signal E1. Another swash plate tilt angle signal E2 is produced through the same signal processing procedure of the other signal processing circuit.

The rest of the operations based on the swash plate tilt angle signals E1 and E2 are the same as those in the foregoing embodiments.

A fourth embodiment of the present invention will be described hereinafter.

Referring to FIG. 4, pressure detectors S3 and S3' are provided in a piping system for the variable displacement pump 4 and the hydraulic motor 6 and in a piping system for the variable displacement pump 5 and the hydraulic motor 7, respectively. The detection signals of the pressure detectors S3 and S3' are applied to a controller 16. In the fourth embodiment, a pitching motion that occurs in a vertical plane containing the diagonal of the skid steer vehicle during turning operation of the skid steer vehicle is detected through the detection of an increase in the pressure of the hydraulic fluid in the piping system for the side plunging down and a decrease in the pressure of the hydraulic fluid in the piping system for the side pitching up.

Figure 7:
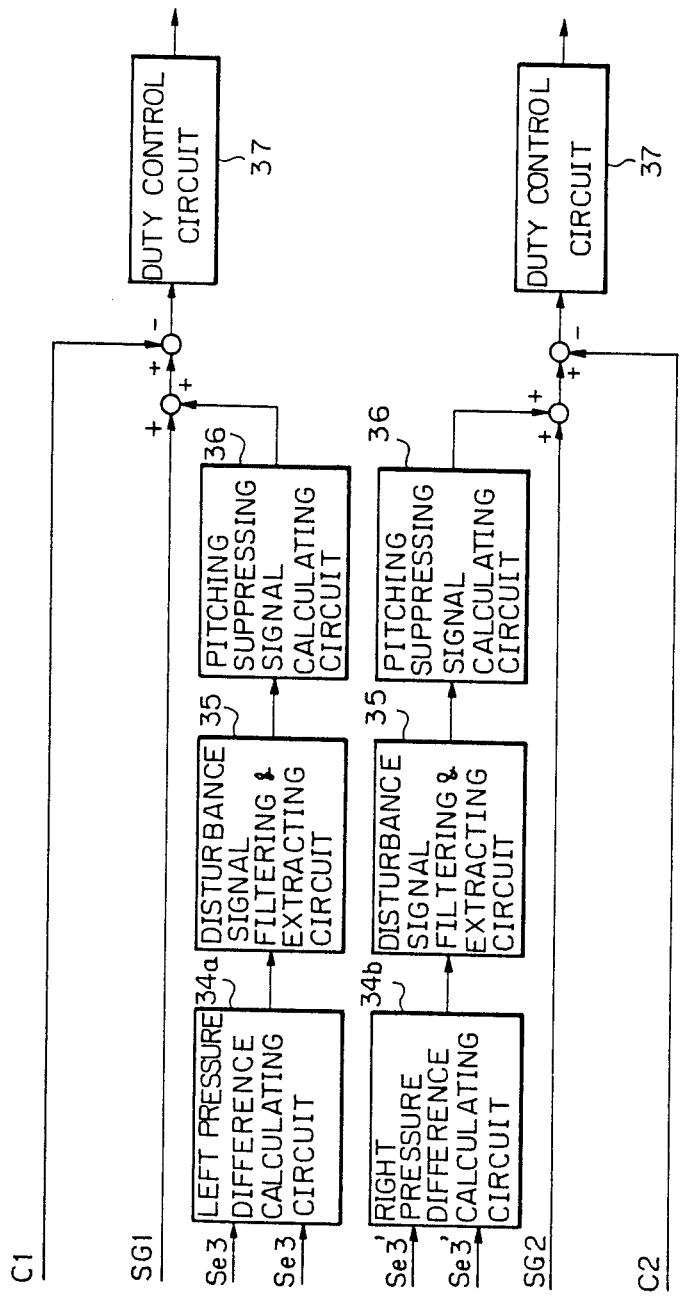
FIG. 7 is a block diagram showing the electrical constitution of a pitching control system, in a fourth embodiment according to the present invention.

Referring to FIG. 7, the controller 16 has a signal processing circuit comprising, in a series connection, a left pressure difference calculating circuit 34a, a disturbance signal filtering and extracting circuit 35, a pitching suppressing signal calculating circuit 36, and a duty control circuit 37, and a signal processing circuit comprising, in a series connection, a right pressure difference calculating circuit 34b, a disturbance signal filtering and extracting circuit 35, a pitching suppressing signal calculating circuit 36, and a duty control circuit 37. Since the respective signal processing modes of these two signal processing circuits are similar to each other, only the signal processing mode of one of the signal processing circuits including the left pressure difference calculating circuit 34a will be described herein.

The detection signals Se3 of the two pressure detectors S3 are applied to the controller 16. Then, the pressure difference calculating circuit 34a processes the detection signals Se3 to calculate the pressure difference between a line associated with one of the pressure detectors S3 and a line associated with the other pressure detector S3 to provide a pressure difference signal. The disturbance signal filtering and extracting circuit 35 filters the pressure difference signal given thereto from the left pressure difference calculating circuit 34a and extracts a disturbance signal corresponding to a disturbance attributable to the pitching motion. Then, the pitching suppressing signal calculating circuit 36 adjusts the gain of the disturbance signal, and shifts the phase of the disturbance signal and inverts same so that the waveform of the disturbance signal conform to an optimum waveform determined for pitching suppressing through experiments. Then, the pitching suppressing signal calculating circuit 36 further adjusts the disturbance signal to a level below an upper limit to provide a pitching suppressing signal. A control amount signal SG1 filtered by a low-pass filter and containing only a fundamental signal is added to the pitching suppressing signal, while a detection signal C1 of the rod position detector 15a is subtracted from the addition. The duty control circuit 37 adjusts the duty ratio of the signal resulting from the addition and subtraction to provide a swash plate tilt angle signal E1. A swash plate tilt angle signal E2 is produced through the same signal processing procedure of the other signal processing circuit. The rest of the operations based on the swash plate tilt signals E1 and E2 are the same as those in the foregoing embodiments.

A fifth embodiment of the present invention will be described hereinafter.

The fifth embodiment employs an accelerometer, not shown. The accelerometer is disposed at a lower position in the operator's compartment of a skid steer vehicle. The accelerator applies an acceleration signal to a controller 16. In this embodiment, the accelerometer is a uniaxial accelerometer capable of detecting acceleration with respect to a single axis, and is disposed so as to detect the lateral acceleration of the skid steer vehicle. However, the accelerometer may be disposed so as to detect the longitudinal acceleration.

Figure 8:
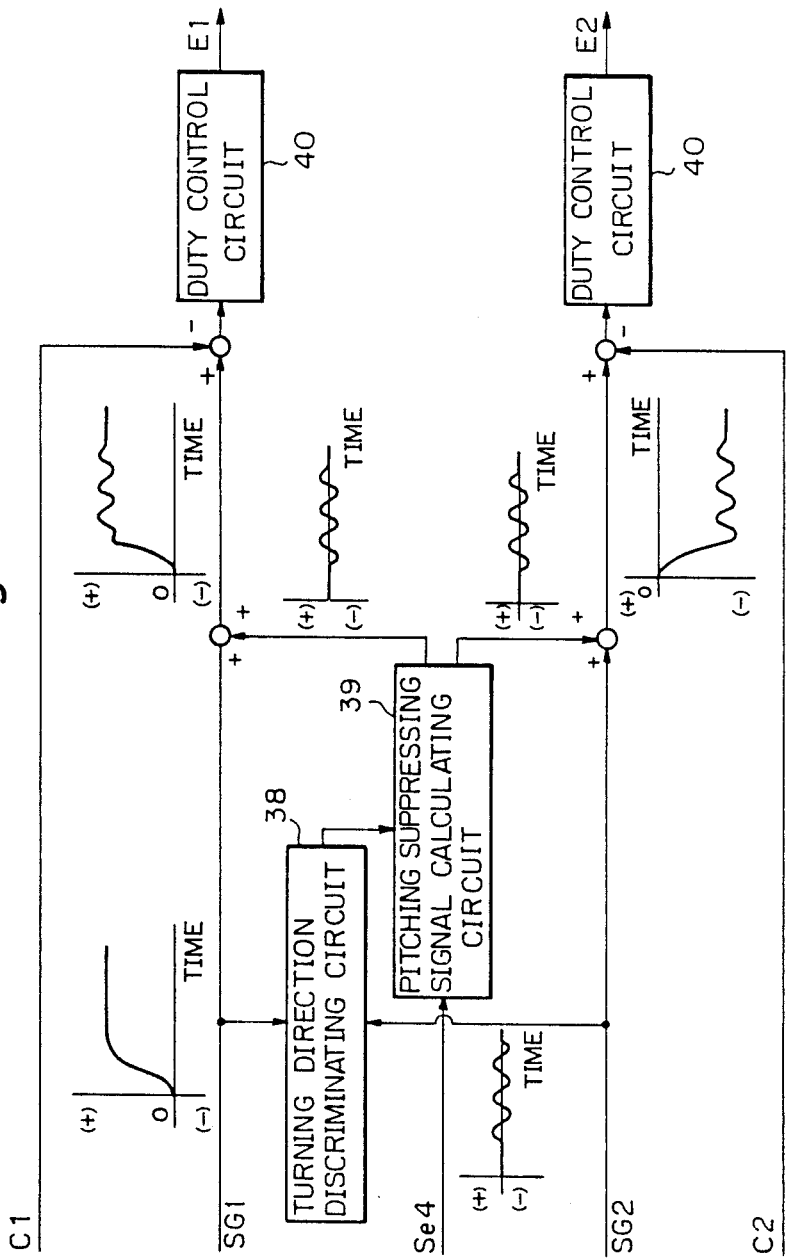
FIG. 8 is a block diagram showing the electrical constitution of a pitching control system, in a fifth embodiment according to the present invention.

Referring to FIG. 8, the controller 16 comprises a turning direction discriminating circuit 38, a pitching suppressing signal calculating circuit 39, and a pair of duty control circuits 40.

The turning direction discriminating circuit 38 compares a control amount signals SG1 and SG2 produced by the left control amount detector 19 and the right control amount detector 20, respectively, to discriminate the current turning direction of the skid steer vehicle. The pitching suppressing signal calculating circuit 39 adjusts the gain of a disturbance signal of an acceleration signal Se4, corresponding to a disturbance attributable to a pitching motion, on the basis of the results of the comparison and adjusts the disturbance signal so that the waveform thereof conforms to an optimum waveform for pitching suppression determined through experiments. That is, the pitching suppressing signal calculating circuit 39 adjusts the phase of the disturbance signal so that the waveform of the disturbance signal is inverted relative to those of the left control amount signal SG1 and the right control amount signal SG2, and adjusts the disturbance signal so that the level thereof is below an upper limit to provide a pitching suppressing signal. Although the disturbance signal is inverted relative to the control amount signals SG1 and SG2 in this embodiment, the disturbance signal may be inverted relative to one of the control amount signals SG1 and SG2 and in phase with the other, or may be in phase with both the control amount signals SG1 and SG2. The control amount signal SG1 filtered by a low-pass filter and containing only a fundamental signal is added to the pitching suppressing signal, and a detection signal C1 of the rod position detector 15a is subtracted from the addition to provide a signal. On the other hand, the control amount signal SG2 filtered by a low-pass filter and containing only a fundamental signal is added to the pitching suppressing signal, and a detection signal C2 of the rod position detector 15b is subtracted from the addition to provide a signal. The duty control circuits 40 adjusts the respective duty ratios these signals resulting from the adding and subtracting operations to provide swash plate tilt angle signals E1 and E2, respectively. The rest of the operations based on the swash plate tilt angle signals E1 and E2 are the same as those in the foregoing embodiments.

Although the accelerometer is disposed, in the fifth embodiment, at a lower position in the operator's compartment so that the same pitching motion as that experienced by the operator will be detected precisely by the accelerometer, the accelerometer may be disposed at any suitable position. Furthermore, the accelerometer may be disposed so as to provide a detection signal corresponding to a combination of a lateral pitching motion and a longitudinal pitching motion. Still further, the accelerometer may be substituted by a distance detector capable of detecting the distance between the ground on which the skid steer vehicle is running and a fixed position on the skid steer vehicle, an angular velocity detector or an inclination detector such as an inclinometer.

A sixth embodiment of the present invention will be described hereinafter.

In the skid steer vehicles incorporating the foregoing embodiments of the present invention, the pitching motions of the skid steer vehicles are controlled by the controllers 16 each including signal processing circuits. The sixth embodiment employs a microcomputer for the program control of a skid steer vehicle. The sixth embodiment will be described as employing the same accelerometer employed in the fifth embodiment as means for detecting a pitching motion.

Figure 9:
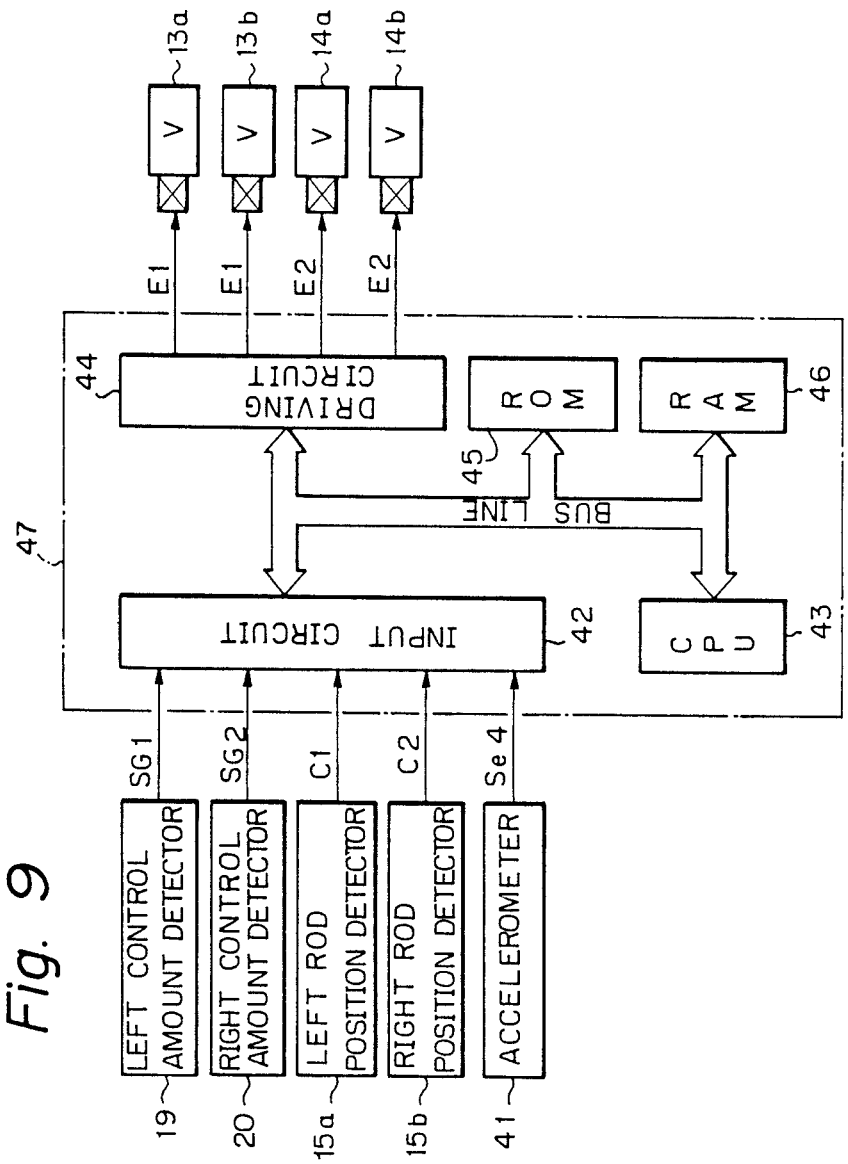
FIG. 9 is a block diagram showing the electrical constitution of a pitching control system, in a sixth embodiment according to the present invention.

The electrical constitution of the microcomputer will be described with reference to a block diagram shown in FIG. 9. A left control amount detector 19, a right control amount detector 20, a left rod position detector 15a, a right rod position detector 15b, and an accelerometer 41 are connected through an input circuit 42 to a central processing unit (hereinafter, abbreviated to "CPU") 43. The CPU 43 receives control amount signals SG1 and SG2, rod position signals C1 and C2, and an acceleration signal Se4 from those detectors, respectively. The CPU 43 is connected through a driving circuit 44 to the poppet valves 13a, 14a and 14b (FIG. 1). A read-only memory (hereinafter, abbreviated to "ROM") 45 is connected to the CPU 43. The CPU 43 operates in accordance with a control program stored in the ROM 45 for executing various routines for processing the signals SG1, SG2, C1, C2 and Se4 applied thereto through the input circuit 42 to provide swash plate tilt angle signals E1 and E2 for the predetermined duty control operation of the poppet valves 13a, 13b, 14a and 14b. A random access memory (hereinafter, abbreviated to "RAM") 46 is connected to the CPU 43 to temporarily store the results of operations of the CPU 43.

The input circuit 42, the CPU 43, the driving circuit 44, the ROM 45, and the RAM 46 are the integral components of a microcomputer 47.

The functions of the microcomputer 47 will be described with reference to flow charts shown in FIGS. 10(a) and 10(b).

Figure 10A:
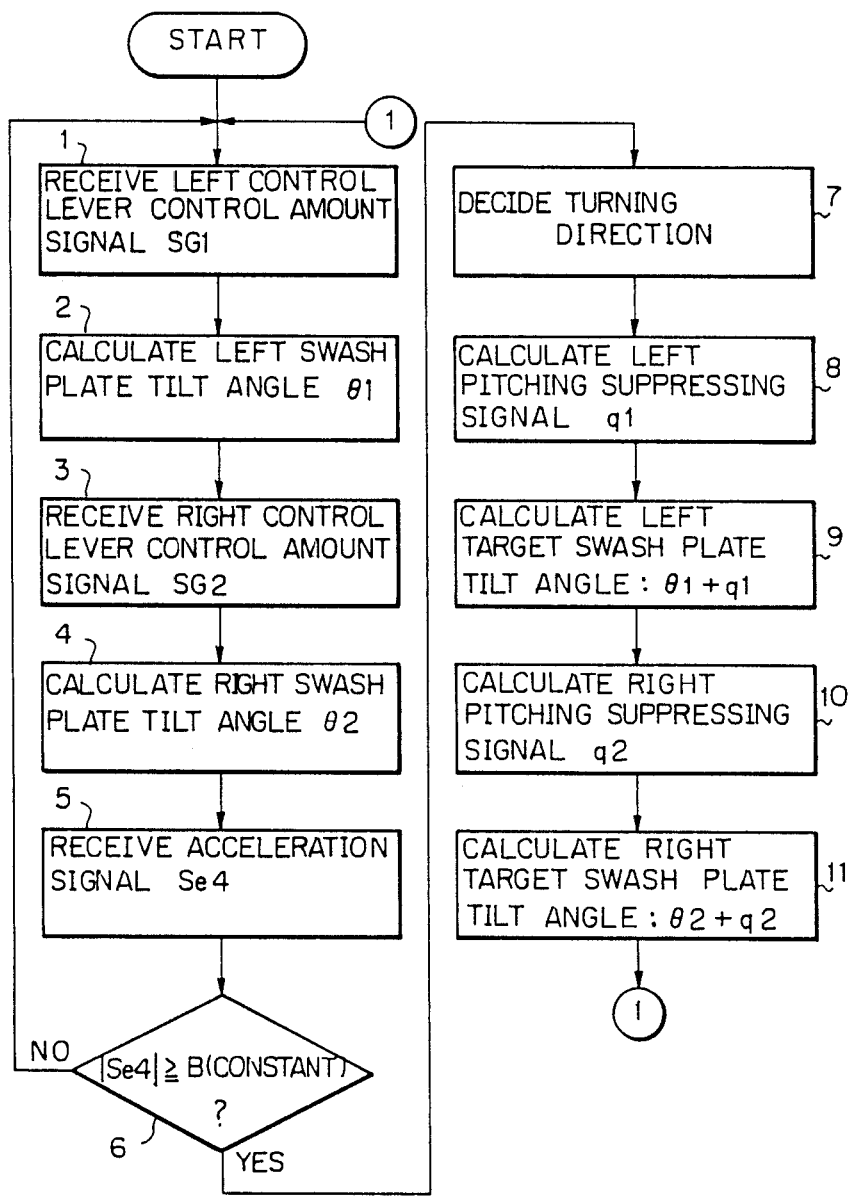
FIGS. 10(a) and 10(b) are flow charts showing the succession of actions of the pitching control system in the sixth embodiment; and, FIGS. 11, 12(a), 12(b), 13(a), 13(b), and 14(a) to 14(d) are time charts showing various modes of waveform control operation, respectively.
Figure 10:
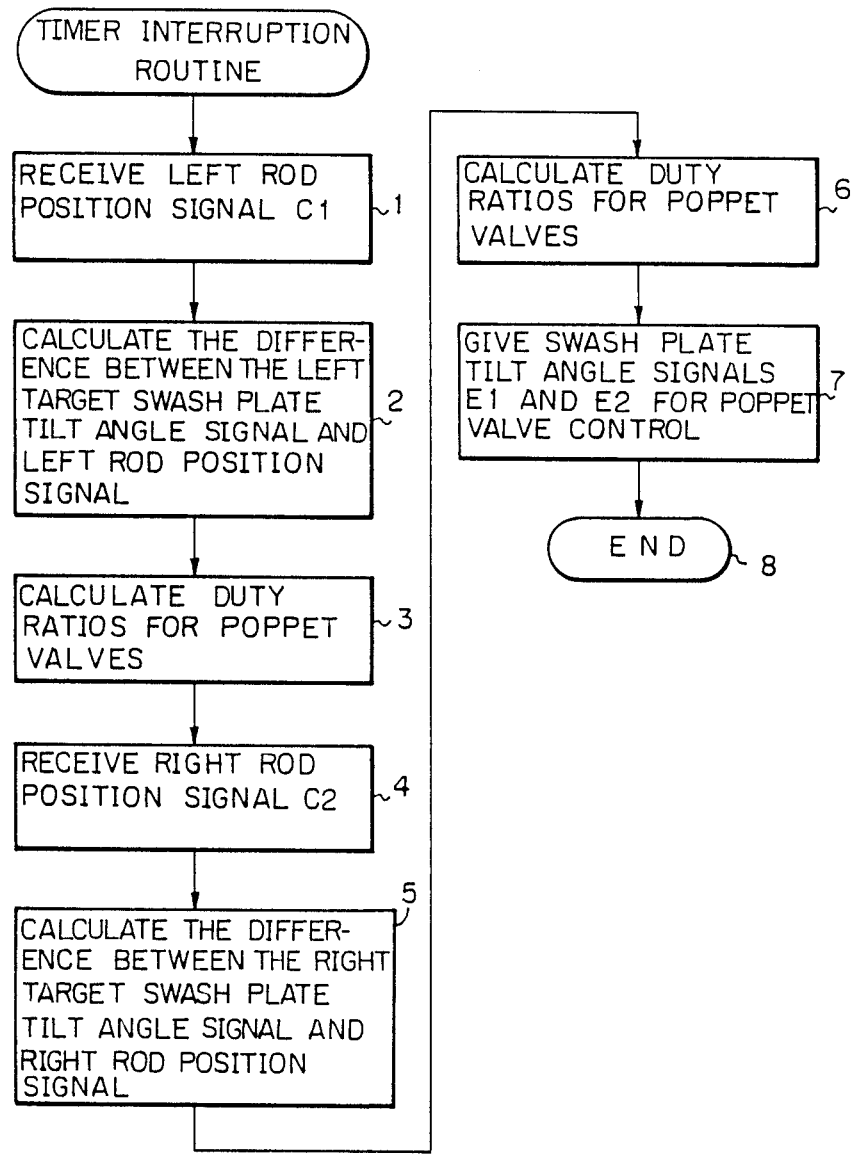

Referring to FIG. 10(a), upon the reception of the left control amount signal SG1 and the right control amount signal SG2, the CPU 43 calculates a left swash plate tilt angle $\theta1$ and a right swash plate tilt angle $\theta2$. Upon reception of the acceleration signal Se4, the CPU 43 decides whether or not the absolute value of the acceleration signal Se4 is greater than a predetermined value B. When the absolute value of the acceleration signal Se4 is greater than the predetermined value B, the CPU 43 decides that a pitching motion has occurred, decides the current turning direction of the skid steer vehicle, and then calculates an optimum left pitching suppressing signal q1 on the basis of the decision. Then, the CPU 43 adds the left pitching suppressing signal q1 to the left swash plate tilt angle $\theta1$ to provide a left target swash plate tilt value $\theta1+q1$. Similarly, the CPU 43 calculates a right pitching suppressing signal q2 and adds this to the right swash plate tilt angle $\theta2$ to provide a right target swash plate tilt value $\theta2+q2$.

Referring to FIG. 10(b), in a timer interruption routine, upon the reception of the left rod position signal C1, the CPU 43 calculates the difference between the left target swash plate tilt value $\theta 1+q1$ and the left rod position signal C1, and then calculates a left duty ratio on the basis of the difference (see step 3). Similarly, upon the reception of the right rod position signal C2, and CPU 43 calculates the right target swash plate tilt value $\theta 2+q2$ and the difference between the right target swash plate tilt value $\theta 2+q2$, and the calculated a right duty ratio on the basis of the difference (see step 6). Then, the CPU 43 provides the left and right duty ratios as swash plate tilt angle signals E1 and E2 to control the poppet valves 13a and 13b, and the poppet valves 14a and 14b, respectively (see step 7).

The CPU 43 executes the steps of the main routine sequentially, and the timer interruption routine, to provide the swash plate tilt angle signals E1 and E2 to achieve the same pitching suppressing control operation as that in the fifth embodiment.

Figure 11:
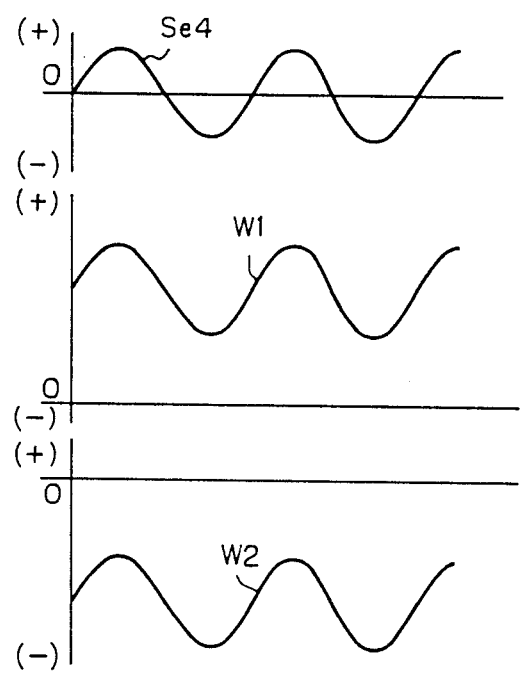

The present invention is not limited to the foregoing embodiments. According to the signal processing mode of the sixth embodiment, the acceleration signal Se4 indicating the occurrence of a pitching motion and having the same phase as those of the left and right control amount signals or having a phase inverted relative to those of the control amount signals is added to the respective fundamental signals of the left and right control amount signal to provide a left additional signal W1 and a right addition signal W2 as shown in FIG. 11. However, the signal processing operation may be executed in the following modes.

The various possible signal processing modes described hereinafter employ the acceleration signal Se4 produced by the accelerometer as, for example, a signal indicating a pitching motion.

Figure 12B:
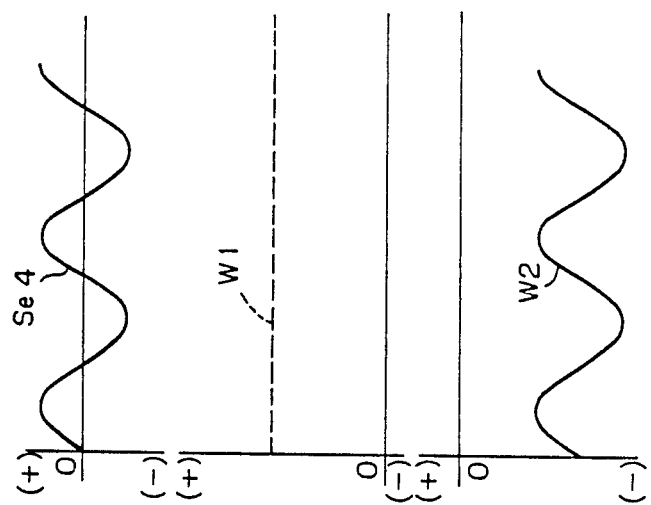
Figure 12A:
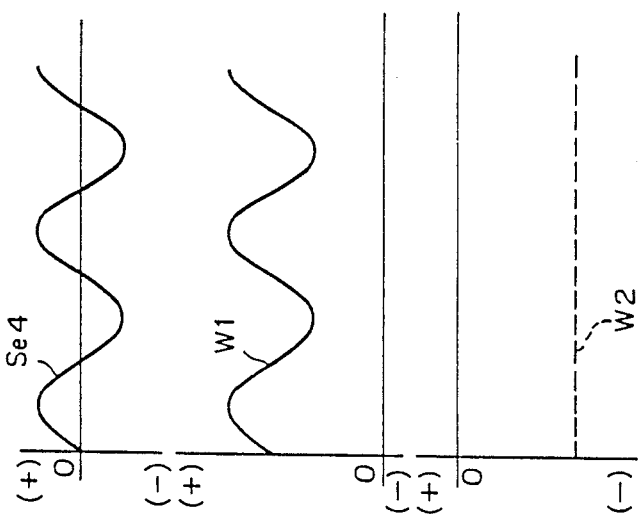

(a) FIGS. 12(a) and 12(b): The inverted acceleration signal Se4 or the acceleration signal Se4 of the same phase is added only to the fundamental signal of either the left control amount signal or the right control amount signal to provide a left addition signal W1 and a right addition signal W2.

Figure 13B:
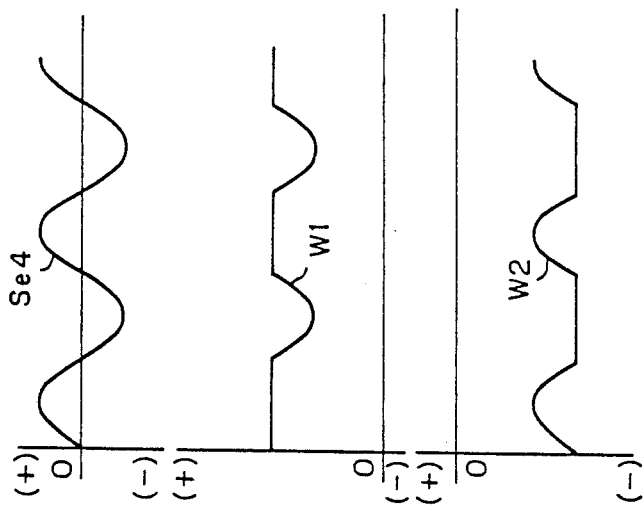
Figure 13A:
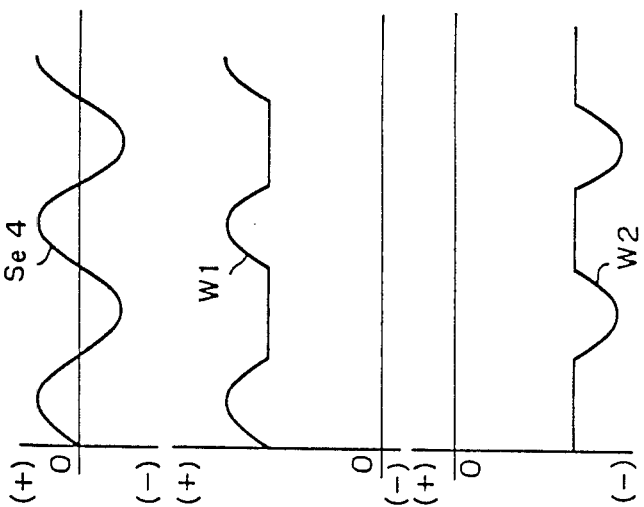

(b) FIGS. 13(a) and 13(b): The positive half waves or the negative half waves of the acceleration signal Se4 are extracted, and are added to the respective fundamental signals of the left and right control amount signals to provide a left addition signal W1 and a right additional signal W2.

(c) FIGS. 14(a), 14(b), 14(c) and 14(d): The positive half waves or the negative half waves of the addition signal Se4 are extracted, and are added to the fundamental signal of either the left control amount signal or the right control amount signal to provide a left addition signal W1 and a right addition signal W2.

The phase of the acceleration signal Se4 need not necessarily be same as or inverted in relation to the phase of the pitching detection signal; the phase of the acceleration signal Se4 may be shifted by any phase angle in relation to the pitching detection signal.

Furthermore, the waveform of the pitching suppressing signal may be any suitable waveform other than a sinusoidal waveform, such as a rectangular waveform, a trapezoidal waveform, a sawtooth waveform or a triangular waveform.

Although the foregoing embodiments of the present invention employ a hydraulic driving system as the driving means, the driving means is not limited thereto, but may be any suitable continuously variable speed transmission capable of operating at an optional transmission ratio, such as a belt type continuously variable speed transmission or a toroidal continuously variable speed transmission.

The present invention is applicable also to a skid steer vehicle employing electric motors as the right and left driving means which are controlled by means of levers for driving the driving wheels 1 and 2.

As apparent from the foregoing description, when a skid steer vehicle starts a pitching motion, the present invention controls the driving system of the skid steer vehicle so as to drive the driving wheels in such a manner that the pitching motion is suppressed, which improves comfort in riding in the skid steer vehicle and the maneuverability of the skid steer vehicle, and enhances the performance of the skid steer vehicle.

We claim:

1. A system for controlling a pitching of a skid steer vehicle including vehicle body, a set of right driving wheels having tires thereon and arranged on one side of the vehicle body, a set of left driving wheels having tires thereon and arranged on an opposite side of the vehicle, a first driving means for driving the set of right driving wheels, a second driving means for driving the set of left driving wheels, and a pair of first and second control levers provided in an operator's compartment of the vehicle body, comprising:

means for generating detection signals indicating detection of a pitching motion of said skid steer vehicle while said skid steer vehicle is in a mode of operation including straight running operation and skid steer turning operation, said pitching motion being based on deformation of said tires and a small wheel base of the vehicle; and control means for generating control signals including pitching suppressing signals on the basis of said detection signals from said means for generating detection signals, said control means simultaneously and independently delivering said control signals to said right and left driving means until said pitching motion of said skid steer vehicle is suppressed.

2. A system for controlling a pitching of a skid steer vehicle, according to claim 1, wherein said skid steer vehicle further comprises a prime mover mounted on said vehicle body, wherein said first driving means comprises:
      a left variable displacement pump driven by said prime mover;
      a left hydraulic motor connected to said left variable displacement pump so as to be operated by a hydraulic fluid supplied thereto from said left variable displacement pump; and,
      a left actuator connected to said left variable displacement pump, for varying a displacement of said left variable displacement pump,
   wherein said second driving means comprises:
      a right variable displacement pump driven by said prime mover;
      a right hydraulic motor connected to said right variable displacement pump so as to be operated by a hydraulic fluid supplied thereto from said right variable displacement pump; and,
      a right actuator connected to said right variable displacement pump, for varying a displacement of said right variable displacement pump,
   and wherein said left and right actuators are operatively connected to said control means so that rotating directions and rotating speeds of respective said left and right hydraulic motors are controlled thereby suppressing said pitching of said skid steer vehicle.

3. A system for controlling a pitching of a skid steer vehicle, according to claim 2, wherein said prime mover of said skid steer vehicle comprises an engine mounted on said vehicle body of said skid steer vehicle.

4. A system for controlling a pitching of a skid steer vehicle, according to claim 1, wherein said first driving means comprises a first electric motor capable of providing said pair of left driving wheels with variable rotary speed and directions, and wherein said second driving means comprises a second electric motor capable of providing said pair of right driving wheels with variable rotary speed and directions.

5. A system for controlling a pitching of a skid steer vehicle, according to claim 4, wherein said first electric motor is connected to said first control lever so as to be adjustably operated by said first control lever, and wherein said second electric motor is connected to said second control lever so as to be adjustably operated by said second control lever.

6. A system for controlling a pitching of a skid steer vehicle, according to claim 1, wherein said means for generating detection signals indicating detection of a pitching motion of said skid steer vehicle comprises:
a first detector for detecting a control amount of said first control lever; and,
a second detector for detecting a control amount of said second control lever, each of said control amounts of said first and second control levers being subjected to a processing of division into a fundamental signal indicating a fundamental amount of control of one of said first and second control levers operated by an operator of said skid steer vehicle, and a disturbance signal indicating a disturbance amount of control of said one of said first and second control levers, caused by said pitching motion of said skid steer vehicle.

7. A system for controlling a pitching of a skid steer vehicle, according to claim 6, wherein said disturbance signal of said each of said first and second detectors is subjected to a processing including a phase controlling and an addition to each said corresponding fundamental signal indicative of a fundamental amount of control of each of said first and second control levers.

8. A system for controlling a pitching of a skid steer vehicle, according to claim 6, wherein said means for generating detection signals indicating detection of a pitching motion of said skid steer vehicle further comprises:
a first detecting device for detecting a change in a first predetermined parameter of said first driving means and said left driving wheels driven by said first driving means; and,
a second detecting device for detecting a change in a second predetermined parameter of said second driving means and said right driving wheels driven by said second driving means.

9. A system for controlling a pitching of a skid steer vehicle, according to claim 8, wherein said first predetermined parameter of said first driving means and said left driving wheels driven by said first driving means is a number of rotation of said left driving wheels, and wherein said second predetermined parameter of said second driving means and said right driving wheels driven by said second driving means is a number of rotation of said right driving wheels.

10. A system for controlling a pitching of a skid steer vehicle, according to claim 8, wherein said first predetermined parameter of said first driving means and said left driving wheels driven by said first driving means is a torque exerted by said first driving means, and wherein said second predetermined parameter of said second driving means and said right driving wheels by said second driving means is a torque exerted by said second driving means.

11. A system for controlling a pitching of a skid steer vehicle, according to claim 8, wherein said first and second driving means comprise a first and a second hydraulic drive means, respectively, wherein said first predetermined parameter of said first driving means and said left driving wheels driven by said first driving means is a hydraulic pressure of said first hydraulic drive means, and wherein said second predetermined parameter of said second driving means and said right driving wheels driven by said second driving means is a hydraulic pressure of said second hydraulic drive means.

12. A system for controlling a pitching of a skid steer vehicle, according to claim 6, wherein said means for generating detection signals indicating detection of a pitching motion of said skid steer vehicle further comprises at least one accelerometer capable of detecting a change in an acceleration of said skid steer vehicle in the mode of operation including straight running operation and skid steer turning operation of said skid steer vehicle.

13. A system for controlling a pitching of a skid steer vehicle, according to claim 12, wherein said change in the acceleration of said skid steer vehicle detected by said accelerometer is subjected to a processing of extracting a disturbance signal indicating said pitching motion of said skid steer vehicle.

14. A system for controlling a pitching of a skid steer vehicle, according to claim 13, wherein said extracted disturbance signal indicating said pitching motion of said skid steer vehicle is subjected to a processing including a phase controlling and an addition to said fundamental signal indicative of a fundamental amount of control of either one of said first and second control levers.

15. A system for controlling a pitching of a skid steer vehicle, according to claim 13, wherein said extracted disturbance signal indicating said pitching motion of said skid steer vehicle is subjected to a processing of a phase control and an extracting half waves of said disturbance signal, said extracted half waves of said disturbance signal being added to each said fundamental signal indicative of a fundamental amount of control of each of said first and second control levers.

16. A system for controlling a pitching of a skid steer vehicle, according to claim 13, wherein said extracted disturbance signal indicating said pitching motion of said skid steer vehicle is subjected to a processing of a phase control and an extracting half waves of said disturbance signal, said extracted half waves of said disturbance signal being added to said fundamental signal indicative of a fundamental amount of control of either one of said first and second control levers.

17. A system for controlling a pitching of a skid steer vehicle, according to claim 1, wherein said control means for generating control signals including pitching suppressing signals on the basis of said detection signals from said means for generating detection signals comprises a micro processor unit mounted on said vehicle body.

* * * * *